United States Patent [19]
Aldrich et al.

[11] Patent Number: 5,906,282
[45] Date of Patent: May 25, 1999

[54] INDEXABLE GLASS SHIPPING APPARATUS

[75] Inventors: Darrell Aldrich, Maple Valley; Yoshiyuki Fujii, Seattle, both of Wash.

[73] Assignee: Northwestern Industries Incorporated, Seattle, Wash.

[21] Appl. No.: 09/040,983

[22] Filed: Mar. 18, 1998

[51] Int. Cl.[6] ...................................................... A47F 5/00
[52] U.S. Cl. ........................................ 211/41.14; 206/454
[58] Field of Search ............................... 211/41.15, 41.1, 211/41.14; 206/448, 454

[56] References Cited

U.S. PATENT DOCUMENTS

| | | | |
|---|---|---|---|
| 3,424,487 | 1/1969 | Pector et al. | 211/41.14 X |
| 3,781,003 | 12/1973 | DeAngelis | 211/41.14 X |
| 4,899,891 | 2/1990 | Sipilä et al. | 211/41.14 |
| 5,505,574 | 4/1996 | Piazza | 211/41.14 X |
| 5,641,076 | 6/1997 | Englund | 211/41.14 |

Primary Examiner—Robert W. Gibson, Jr.
Attorney, Agent, or Firm—Christensen O'Connor Johnson & Kindness PLLC

[57] ABSTRACT

An indexable glass shipping apparatus that can be used in conjunction with reusable steel racks or other glass shipment racks. The apparatus includes a catalog made up of a plurality of sheets of shock absorbent material, spaced from each other to accommodate glass panes between. The sheets are fastened together by a series of fasteners located along a lower edge of the catalog. In one embodiment, the lower edge is journaled to conform to the shape of a steel rack, to minimize any risk of longitudinal movement of the catalog on the rack. The sheets of the catalog may be indexed to facilitate selection of glass panes. In addition, an outer protective cover is provided, that is secured to the outside of the catalog after it is mounted on the glass shipment rack. The lower edge of the cover is supplied with a pair of camming levers that engage longitudinal rails of the glass shipment rack, and the upper end of the cover is supplied with a quick release strap mechanism that allows ready access to glass panes in the catalog.

15 Claims, 6 Drawing Sheets

INDEXABLE GLASS SHIPPING APPARATUS

FIELD OF THE INVENTION

The invention relates to an apparatus for transporting glass panes, and indexing panes of difference size to facilitate stacking in the apparatus, and removal from the apparatus. Moreover, the apparatus reduces the incidence of breakages of the glass panes.

BACKGROUND OF THE INVENTION

Planar glass panes are produced, cut to specific size, and shipped to users. Frequently, a multiplicity of glass panes of different sizes are shipped to the same customer, and are transported on a single glass shipping rack. As explained below, while this facilitates mass glass shipment, it hinders the customer in selection of the order in which individual glass panes must be removed from the shipping rack.

Currently, there are at least three apparatus in use for shipping plate glass. One means is to pack the glass plates in a wooden case, which provides good protection, but incurs a relatively high cost in construction, packing and disposal. The wood case must be inclined before opening to ensure that the glass will not fall out. This is typically achieved by leaning the case against a wall, post, or an A-frame style rack. Unless the wooden case is covered by a top, the glass can be wetted or otherwise damaged by environmental conditions. Moreover, unless all the glass panes in the case are of the same size, the panes must be moved individually and sorted to allow selection of each particular pane, as needed by the customer. This sorting operation requires space, labor, and increases the risk of breakage.

As an alternative to wooden cases, steel reusable racks are also presently in use. These racks, an embodiment of which is illustrated in FIG. 1, can be of the L-frame-type or the A-frame type. Since these frames are reusable, they offer the advantage of reduced overall cost compared to wooden racks, but they have a higher initial investment cost, and there is an additional freight cost for returning empty racks to the glass supplier. There are several different methods for securing plate glass to steel racks. These range from simple cords or ropes to padded bars that can be adjusted to suit a particular load requirement. Because the glass plate leans against the rack structure, any restraint used to secure the glass during transportation can be removed without risk of glass falling and breaking. Racks are typically constructed to be handled with forklifts, cranes or other common material handling machines.

In the case of steel racks, as in wooden racks, organizing the order of the glass on the rack is dictated by reduction of the risk of breakage. Thus, the largest sized pieces are loaded first, followed by progressively smaller panes. However, this may not be the order in which the customer desires to utilize the glass panes. Accordingly, steel racks suffer from the same shortcoming as wooden cases in that additional handling of the glass panes is necessary to arrange them in the proper order for use.

Plate glass is also shipped on harp racks or slot racks, which include a series of covered cables strung tight to a framework to act as separators and to support individual panes of glass. This type of rack is advantageous because it allows the user to store or retrieve the glass in any order necessary to facilitate efficient utilization. However, this type of rack requires more physical space for storage because each slot requires a separation area from the adjacent slot. Moreover, the overall size of the rack must physically accommodate the largest possible glass pane. Furthermore, the glass panes are not entirely separated from each other, and can scratch or damage adjacent panes when inserted or withdrawn from the rack. Finally, it is a major disadvantage of this type of rack that it can only be used on a flat floor surface, because the glass cannot be secured to the rack. Thus, the rack is unsuitable to ship the glass panes to another location.

There exists a need for a method of shipping glass plate from one facility to another that allows the customer ease of selection between the panes being shipped, and that reduces the risk of glass breakage.

SUMMARY OF THE INVENTION

The invention provides an indexable glass shipping apparatus that can be used in conjunction with reusable steel racks, currently commercially available. The apparatus includes a plurality of stacked sheets of a shock absorbent material. These sheets are separated from each other along one edge by a series of spacers, that are sized to provide a sufficient gap between adjacent sheets to fit a glass pane. These sheets are fastened together into a stack by fasteners located along the edge of the sheets, in the vicinity of the spacers. Thus, the sheets form a "catalog" with spaces between for receiving panes of glass.

Each of the sheets of the catalog may be indexed, by adding an index tab bearing either a code or an optically readable bar-code to identify each individual glass pane. This facilitates both storage of glass panes in the apparatus, and customer selection and removal of a particular glass pane. Moreover, because the sheets are semi-rigid, and shock absorbent, the incidence of breakages is reduced.

In addition, the catalog apparatus may also include an outer more rigid, shock absorbent cover, such as a plywood cover, supplied with fastening means to secure the catalog apparatus to a steel rack for transportation.

In accordance with the invention, glass may now be organized in any particular order that is convenient for the seller or customer. Thus, glass panes need no longer be stacked in sequential order from the largest to the smallest. The index tabs allow ready identification of each glass pane, and of its selection. The rack utilizes less space then harp racks, and requires less glass handling (thereby reducing risk of breakage) than harp, steel, or wooden racks. Finally, the use of shock absorbent material for the sheets eliminates direct contact between adjacent glass panes, thereby reducing the risk of breakages and damage.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
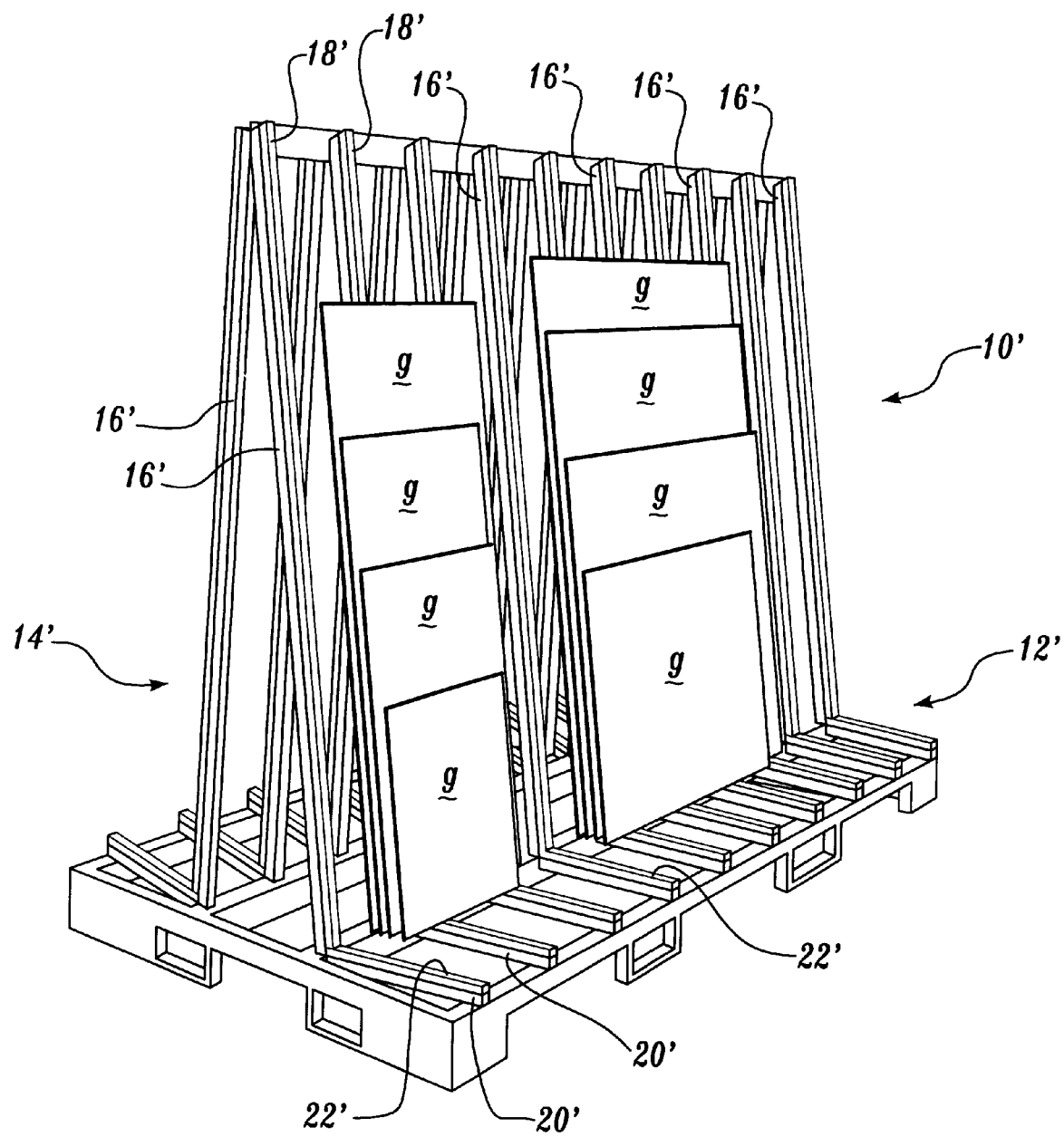
FIG. 1 is an illustrative perspective view of a prior art A-frame-type metal rack with glass panes.

FIG. 1 illustrates an embodiment of a prior art steel rack used for shipping plate glass. The steel rack 10' includes a horizontal, rectangular base 12' and a vertical A-frame 14' extending upward from the central spine of the base 12'. The A-frame 14' includes a series of angled posts 16' extending from the top of the A-frame to the base 12', to form the A-frame 14' extending along the steel rack 10'. Each of the angled posts 16' has a shock absorbent bumper or rubber strip 18' on its outboard surface, against which glass panes g are leaned on the steel rack for shipping. The glass panes g also rest on a series of horizontal transverse support brackets 20' of the base 12', each of which has a shock absorbent bumper or rubber strip on its upper surface 22', for supporting the glass panes, to reduce risk of breakage.

As explained above, when using the conventional steel glass racks, glass panes g are stacked in order, from largest (nearest to posts 16') to smallest (outboard), to reduce the risk of breakages. The base of the steel racks 12' may be supplied with couplers 26' for engaging forks of a forklift truck to facilitate transportation. Glass is typically secured to the racks by means of ropes or other flexible material.

Figure 2:
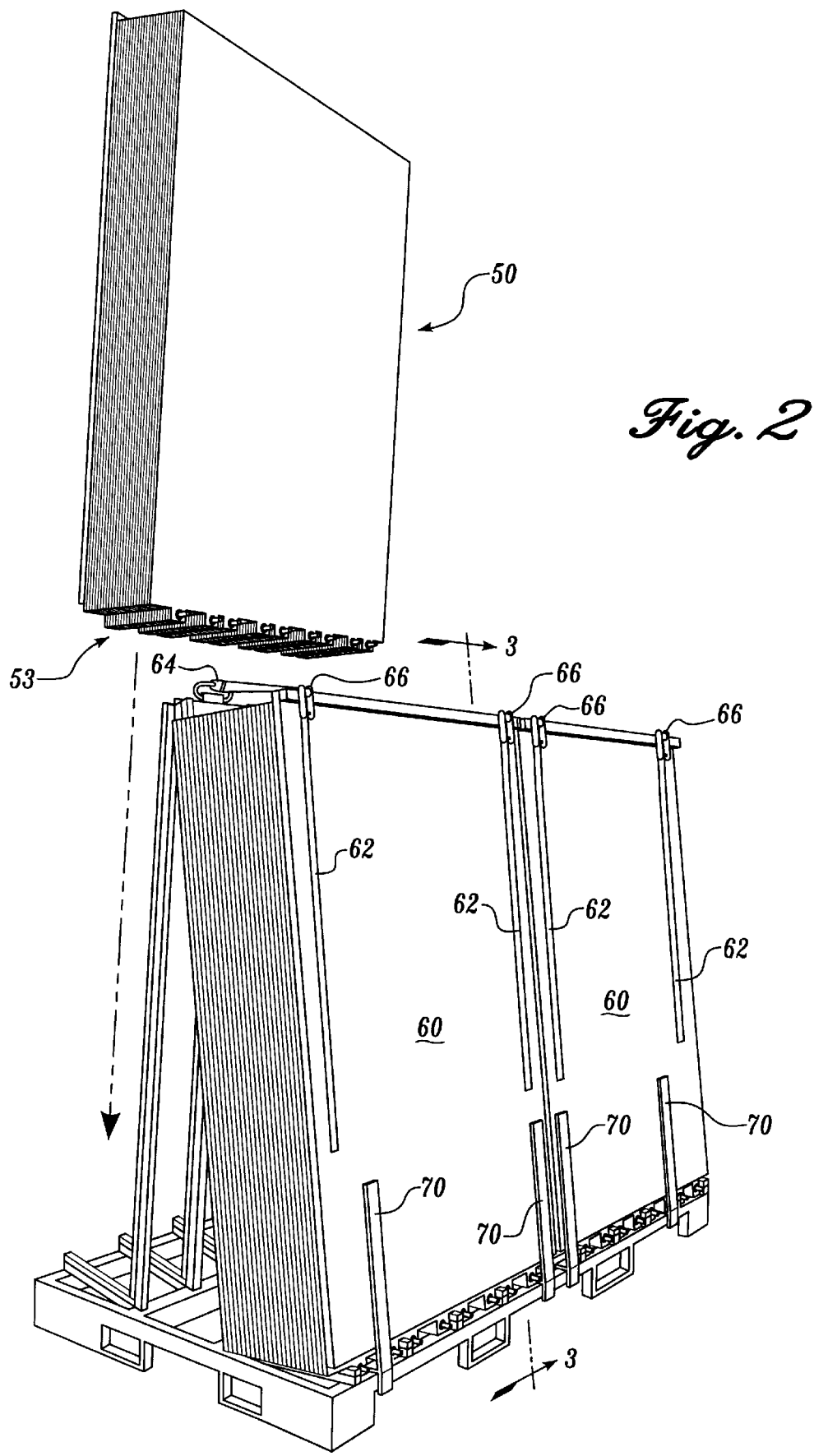
FIG. 2 is a schematic diagram, in perspective view, showing a catalog of stacked sheets in accordance with an embodiment of the invention, resting on an A-frame-type metal rack and a second catalog exploded from its position.

A catalog 50 of individual semi-rigid sheets 52 in accordance with a preferred embodiment of the invention is shown in FIG. 2. The sheets are preferably of corrugated plastic (or paper) that is semi-rigid, able to support itself vertically without collapsing. This type of material also provides shock absorbent properties and reduces glass breakage when inserted between adjacent glass panes. The plurality of sheets are bound together near a lower edge 53 by a series of fasteners 54. (See FIGS. 6A and 6B) Each sheet is separated from an adjacent sheet by a spacer 56 (or 57), such as for example, cylindrical rubber (elastomeric, shock absorbent) washers, or a slat 57, having a thickness approximating the thickness of glass panes to be transported, each with a throughbore for receiving the fastener 54.

Figure 3:
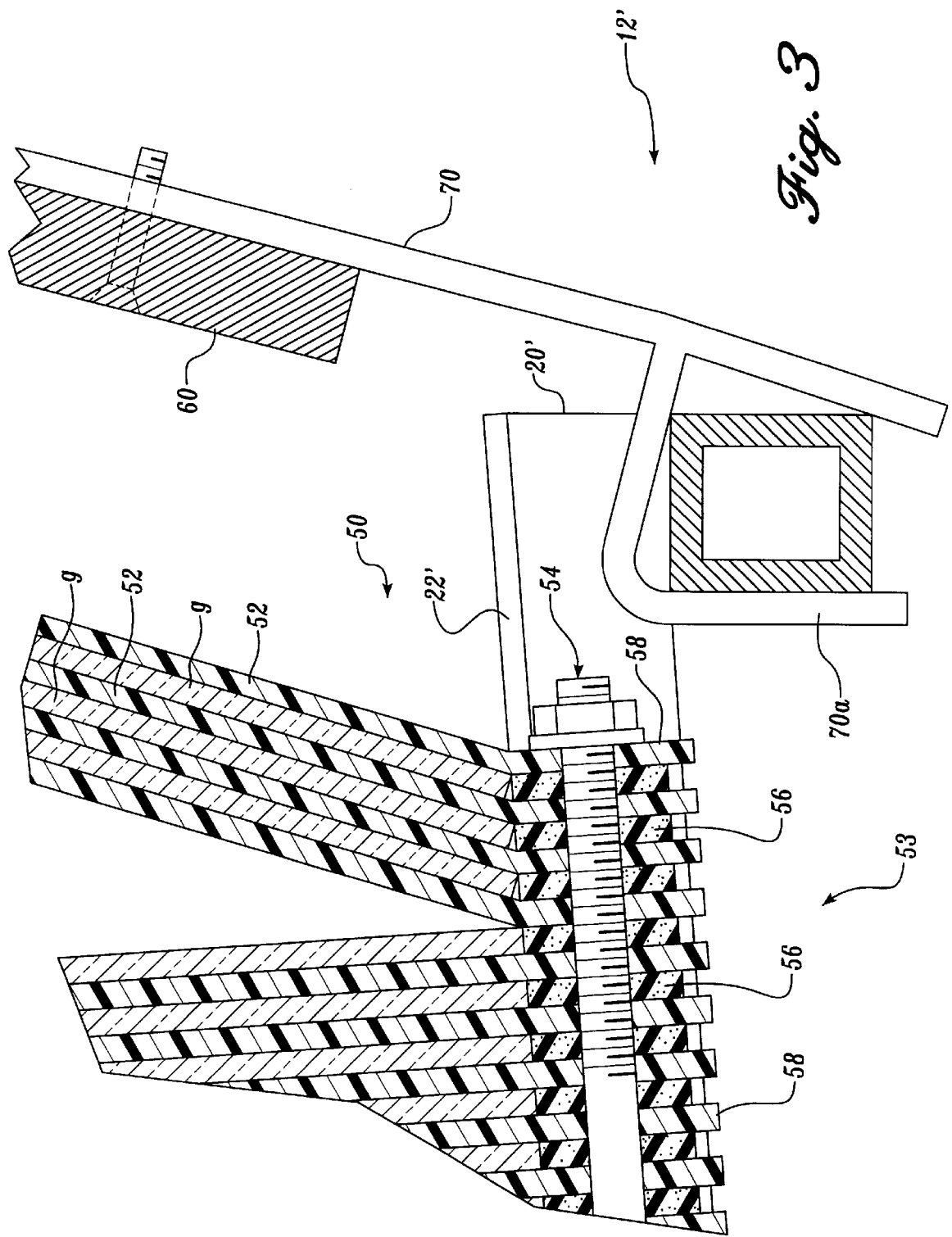
FIG. 3 is a partial end view in cross section at 3—3 of FIG. 2 (with catalog opened) showing details of spacers and fasteners of the catalog of sheets of an embodiment of the invention.
Figure 6A:
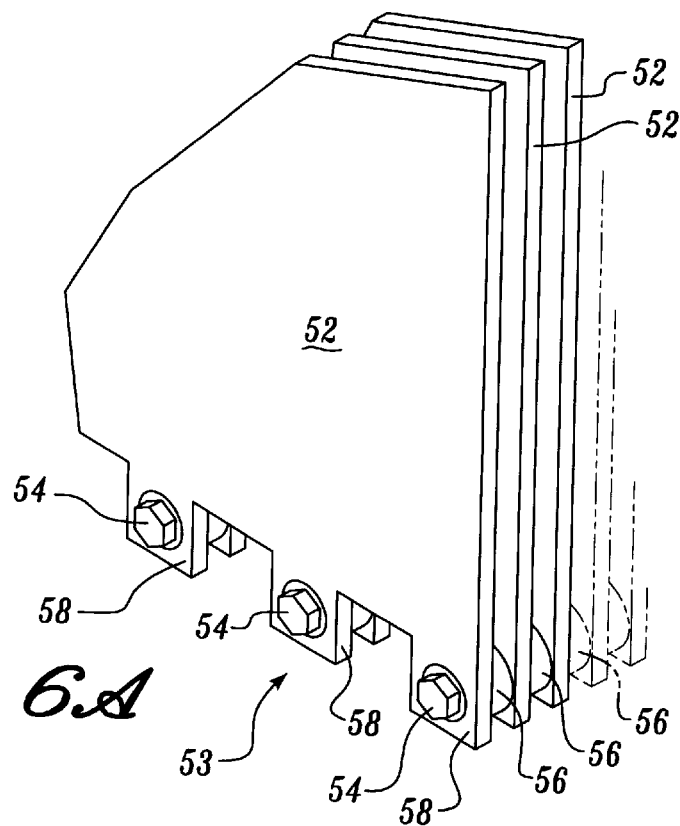
FIG. 6A is a schematic partial perspective view showing sheets cataloged together with cylindrical spacers between, and the journaled lower edge of this embodiment of the catalog of the invention.

In the illustrated embodiment shown in more detail in FIG. 6A, and FIG. 3, the catalog 50 is designed for use in conjunction with a steel rack 10'. Accordingly, the lower edge is supplied with a series of outwardly extending tabs 58, with spacers 56 between the tabs of each sheet, and a fastener 54 extending through each of the adjacent tabs and the throughbores of the spacers. Thus, the tabbed lower edge 53 of the catalog 50 is journaled, providing a series of outward-extending "ridges" that cooperate with the gaps between the support brackets 20' of the base 12' of the steel rack 10'. This journaled lower edge design reduces the risk of the catalog 50 sliding longitudinally along the steel rack 10'. Moreover, the tabs 58 and spacers 56 are preferably sized such that when the catalog 50 is on the rack 10", a glass pane placed between adjacent sheets 52 would rest on the series of bumper strips 22', and not on the fastener 54, or the spacers 56. This reduces the risk of glass breakage.

Figure 6B:
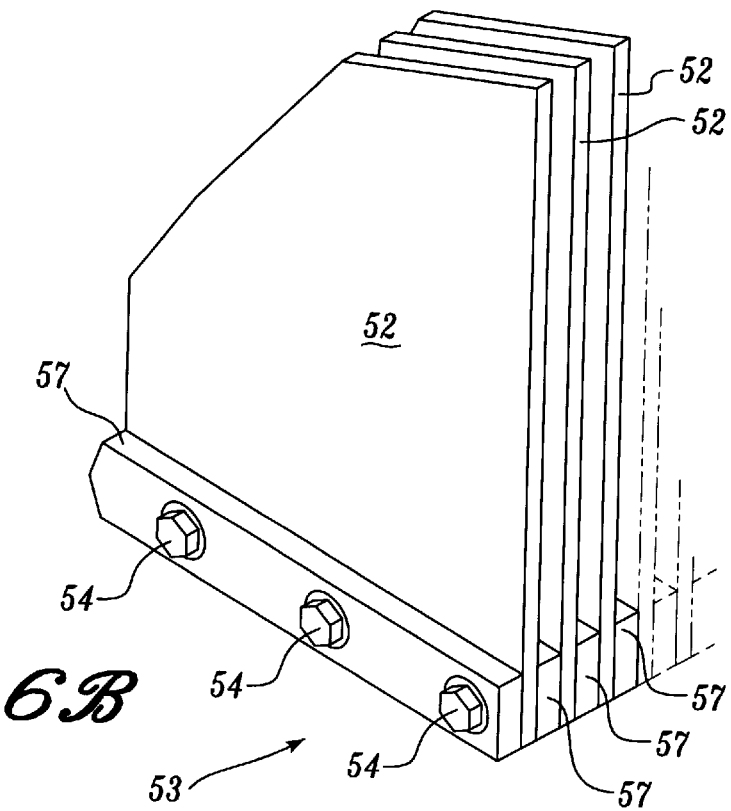
FIG. 6B is another embodiment of the catalog of the invention, in partial schematic perspective view, showing slats between catalog sheets and a flat or smooth lower edge.

In an alternate preferred embodiment, shown in FIG. 6B, the binding at the lower edge 53 of the catalog 50 includes a series of slats 59 interposed between sheets 52 of the catalog 50. The slats are held in place by a series of fasteners 54 spaced along the length of the catalog 50 and each extending through the thickness of the catalog. The glass panes g rest on the slats. This lower edge is not journaled but provides other advantages.

Figure 4:
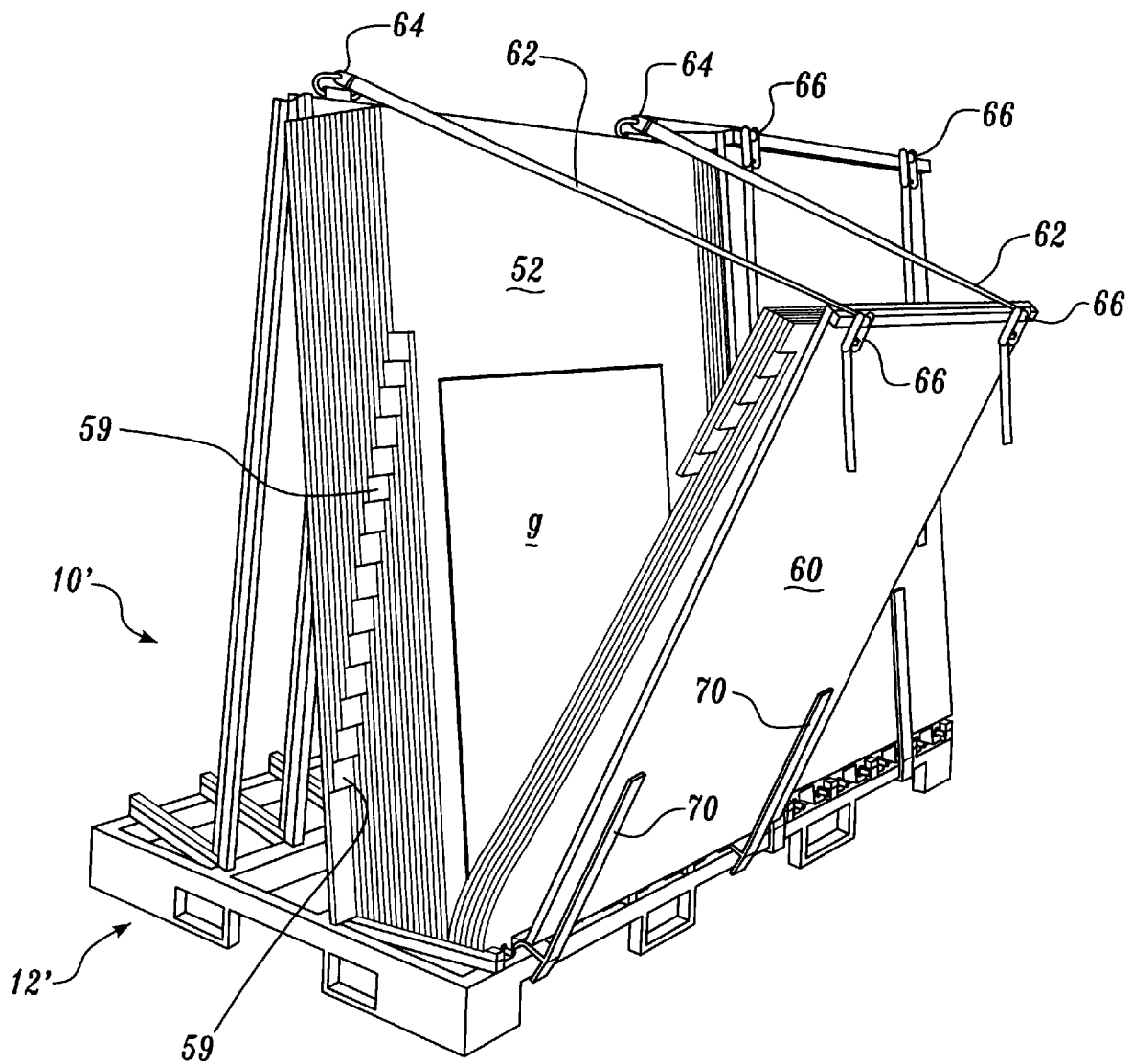
FIG. 4 is a schematic perspective view of an embodiment of the apparatus of the invention, showing sheets with index tabs, a glass pane between sheets of the catalog apparatus, and an outer cover.
Figure 5:
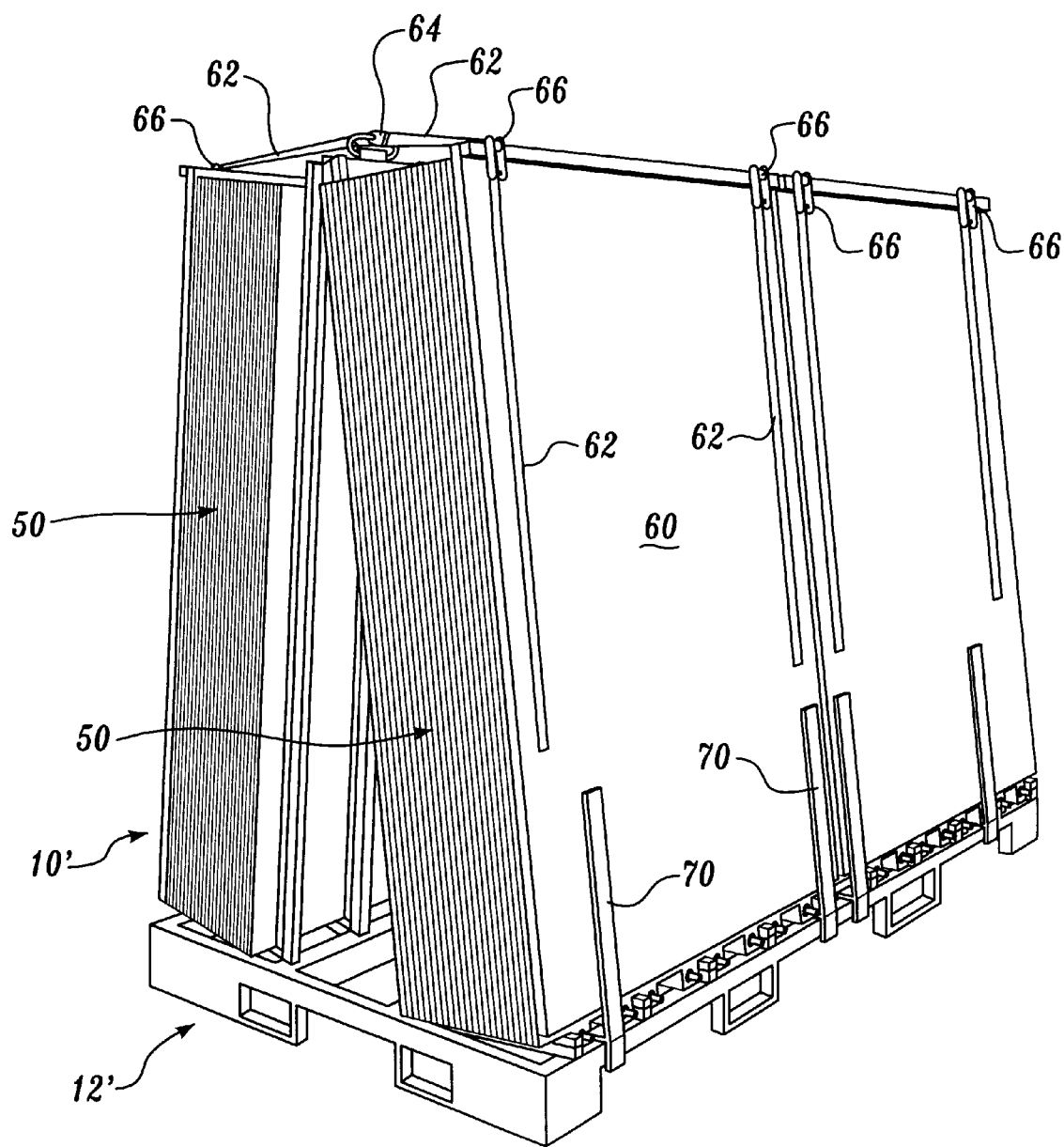
FIG. 5 is a schematic perspective view of an indexed glass shipping rack carrying two catalogs in accordance with an embodiment of the invention.

As shown in FIG. 4, each of the sheets 50 may be tabbed with a tag 59, to provide an index for each specific pane of glass being transported. Thus, glass panes may be added to the catalog 50, and its adjacent sheet 52 appropriately indexed through its tag 59, in order of production or in order of anticipated customer selection from the catalog. Upon receipt by the customer, the customer may then remove glass panes based upon need, by referring to the index. The index may comprise any code, including numerical, alphabetical, alphanumerical, or bar-codes readable with optical scanning devices.

The catalog 50 may be further protected by the addition of an outer protective "hard cover" 60 that may be fabricated from plywood, or any other lightweight protective material. The cover 60 is applied to the outermost of the sheets 52 and is secured in place to the steel rack 10' by any of a variety of means. In the embodiment shown (see also FIG. 3), the cover 60 is secured to the base 12' of the frame 10' by a pair of camming levers 70 that each have a claw 70a for engaging a longitudinal rail of the base 12'. Thus, the cover 60 is opened by pulling the cover (and the pair of levers 70) away from the central A-frame 14' of the steel rack 10'. The top of the cover 60 is secured by a pair of straps 62 to the upper end of rack 10'. The cover 60 is preferably releasably secured to the steel rack 10', by a hook and eyelet fastening device 64. To facilitate opening and closing of the cover 60, the strap 62 preferably engages a quick-release clip 66 mounted to cover 60 that allows the strap to be pulled taut for closure, and released for opening of the cover 60 Thus, the customer may readily access the contents of the catalog by releasing the quick-release clip 66, "paging through" the tabbed sheets 52 of the catalog 50, selecting the appropriate glass pane g, and removing that pane. The entire catalog may then be closed, and the cover releasably secured.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An apparatus for storing plate glass for shipment, the apparatus comprising:
   (a) a catalog comprising:
      (i) a plurality of stacked sheets of a shock absorbent material;
      (ii) spacers located between adjacent sheets, proximate lower edges of the adjacent sheets, the spacers sized to accommodate a thickness of a glass pane between the adjacent sheets;
      (iii) means for fastening the sheets to form the catalog, the means proximate the lower edges of the sheets; and
   (b) means for securing the catalog to a glass shipment rack for transportation.

2. The apparatus of claim 1, wherein the spacers are elastomeric cylinders, each having a central throughbore and a thickness approximating the thickness of a glass pane to be transported.

3. The apparatus of claim 1, wherein the sheets comprise corrugated plastic sheets.

4. The apparatus of claim 2, wherein the means for fastening comprise bolts extending through throughbores of the spacers and the sheets.

5. The apparatus of claim 1, wherein at least some of the plurality of sheets is indexed by means of a tab bearing a code.

6. The apparatus of claim 1, wherein lower edges of each of the plurality of sheets further comprise a series of outwardly-extending tabs, the spacers located between the tabs of adjacent sheets, and the means for fastening extending through the spacers, the tabs sized to cooperate with slots in a base of a glass-shipment rack.

7. The apparatus of claim 1, further comprising a cover, the cover protecting an outer surface of the catalog, the cover comprising a strap and quick release clip to allow opening of the cover and separating of sheets of the catalog for access to spaces between individual ones of said sheets.

8. The apparatus of claim 1 wherein the spacers are longitudinally extending slats.

9. The apparatus of claim 7, further comprising a camming lever having a claw for engaging a rail of a glass shipment rack, the lever having an arm attached to the cover so that the cover opens by pivoting the claw of the lever about the rail of the rack, when the catalog is mounted to the rack.

10. An apparatus for storing plate glass for shipment, the apparatus comprising:
   (a) a catalog comprising:
      (i) a plurality of stacked sheets of a shock absorbent material;
      (ii) spacers located between adjacent stacked sheets, the spacers located proximate lower edges of the sheets;
      (iii) fasteners extending through the stacked sheets and spacers to bind the sheets into a catalog;
   (b) a catalog cover comprising
      (i) a protective cover sized to shield an outer surface of the catalog;
      (ii) a camming lever attached to a lower end of the cover, the lever having a claw for engaging a glass transportation rack; and
      (iii) a releasable fastener comprising a strap and a quick-release clip mounted to the cover, the strap having one end adapted for securing to a glass shipping rack.

11. The apparatus of claim 10, wherein the spacers are elastomeric cylinders, each having a central throughbore and a thickness approximating the thickness of a glass pane to be transported.

12. The apparatus of claim 10, wherein the sheets comprise corrugated plastic sheets.

13. The apparatus of claim 10, wherein at least some of the plurality of sheets are indexed by means of a tab bearing a code.

14. The apparatus of claim 10, wherein lower edges of each of the plurality of sheets further comprise a series of outwardly-extending tabs, the spacers located between the tabs of adjacent sheets, and the fasteners extending through the spacers, the tabs sized to cooperate with slots in a base of a glass-shipment rack.

15. The apparatus of claim 10, wherein the spacers are longitudinally extending slats.

* * * * *